US012285940B2

(12) United States Patent
Eto

(10) Patent No.: US 12,285,940 B2
(45) Date of Patent: Apr. 29, 2025

(54) INKJET RECORDING APPARATUS

(71) Applicant: KYOCERA Document Solutions Inc., Osaka (JP)

(72) Inventor: Daisuke Eto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 119 days.

(21) Appl. No.: 18/003,235

(22) PCT Filed: Jun. 24, 2021

(86) PCT No.: PCT/JP2021/024008
§ 371 (c)(1),
(2) Date: Dec. 23, 2022

(87) PCT Pub. No.: WO2021/261566
PCT Pub. Date: Dec. 30, 2021

(65) Prior Publication Data

US 2023/0249479 A1 Aug. 10, 2023

(30) Foreign Application Priority Data

Jun. 26, 2020 (JP) ................................ 2020-110695

(51) Int. Cl.
*B41J 11/00* (2006.01)
*B41J 2/01* (2006.01)
(Continued)

(52) U.S. Cl.
CPC ................ *B41J 13/08* (2013.01); *B41J 2/01* (2013.01); *B41J 2/16544* (2013.01);
(Continued)

(58) Field of Classification Search
CPC . B41J 13/08; B41J 2/01; B41J 2/16544; B41J 11/005; B41J 11/007; B41J 11/0085
See application file for complete search history.

(56) References Cited

U.S. PATENT DOCUMENTS

2002/0167578 A1 11/2002 Miki et al.
2003/0227507 A1* 12/2003 Kinoshita ............ B41J 2/16538 347/33
2010/0231675 A1* 9/2010 Kato ...................... B41J 11/007 347/104

FOREIGN PATENT DOCUMENTS

JP H11-115274 A 4/1999
JP H11-216919 A 8/1999
(Continued)

*Primary Examiner* — Yaovi M Ameh
(74) *Attorney, Agent, or Firm* — Studebaker Brackett PLLC

(57) ABSTRACT

A printer (1) includes an endless conveyance belt (45) which attracts a sheet and conveys it in a predetermined conveyance direction; a recording head (30) provided with an ejection port formed surface (31) on which an ejection port for ejecting ink is formed, the ejection port formed surface (31) facing an outer circumferential surface of the conveyance belt (45) with a predetermined gap; and a conveyance guide (70) which faces the conveyance belt (45) on an upstream side of the ejection port formed surface (31) in the conveyance direction, is provided within a range containing both end portions of the conveyed sheet in a width direction intersecting the conveyance direction, and projects toward the conveyance belt (45) more than the ejection port formed surface (31).

6 Claims, 13 Drawing Sheets

(51) Int. Cl.
*B41J 2/165* (2006.01)
*B41J 13/08* (2006.01)

(52) U.S. Cl.
CPC ............ *B41J 11/005* (2013.01); *B41J 11/007* (2013.01); *B41J 11/0085* (2013.01)

(56) References Cited

FOREIGN PATENT DOCUMENTS

| | | | | | |
|---|---|---|---|---|---|
| JP | 2002-225358 | A | | 8/2002 | |
| JP | 2003072174 | A | * | 3/2003 | .............. B41J 13/10 |
| JP | 2008-238427 | A | | 10/2008 | |
| JP | 2009012412 | A | * | 1/2009 | ................ B41J 2/01 |
| JP | 2010-095366 | A | | 4/2010 | |
| WO | 2018/155568 | A1 | | 8/2018 | |

* cited by examiner

INKJET RECORDING APPARATUS

TECHNICAL FIELD

The present invention relates to an inkjet recording apparatus which forms an image by ejecting ink.

BACKGROUND

An inkjet recording apparatus is known in which a sheet is attracted to a conveyance belt to be conveyed, and ink droplets are ejected onto the sheet from a recording head whose bottom surface has a number of ejection ports aligned in the width direction intersecting the conveyance direction. The conveyance belt is formed with a number of through-holes through which air is sucked to attract the sheet to the conveyance belt. In addition, in order to land the ink droplets on the sheet accurately, the bottom surface of the recording head and the upper surface of the conveyance belt face each other with a narrow gap (for example, about 1 mm).

However, at both end portions of the sheet in the width direction, the sheet may float from the conveyance belt because air easily enters between the sheet and the conveyance belt. In such a case, the sheet may come into contact with the recording head, resulting in a delay in the conveyance of the sheet, and the sheet may be jammed between the recording head and the conveyance belt. In addition, if the sheet comes into contact with the recording head, the ejection port and its surrounding area may be damaged.

Therefore, a technique to suppress the floating of the sheet has been studied. For example, Patent Document proposes to form a support surface having recesses at both the end portions of the sheet in the width direction. Patent Document 2 proposes retracting the head when a floating sheet is conveyed. Patent Document 3 proposes to provide a spur on the upstream side of the head to suppress the floating of the sheet. Patent Document 4 proposes a configuration in which a suction member regulating the position of the sheet in the thickness direction attracts the front or rear end portion of the sheet and moves integrally with the sheet. Patent document 5 proposes to provide an upstream side guide roller which is pressed against the upper surface of the conveyance path on the upstream side of the head in the conveyance direction of the sheet and rotated.

PRIOR ART DOCUMENTS

Patent Document

Patent Document 1: Japanese Patent Laid-Open No. 2002-225358

Patent Document 2: International Publication No. 2018/155568

Patent Document 3: Japanese Patent Laid-Open No. H11-115274

Patent Document 4: Japanese Patent Laid-Open No. H11-216919

Patent Document 5: Japanese Patent Laid-Open No. 2010-95366

SUMMARY OF THE INVENTION

Problems to be Solved by Invention

However, in the configuration proposed in Patent Document 1, there is a risk that the sheet may float without being attracted sufficiently. In addition, if the suction force is increased, the trajectory of ink droplets may be disturbed by wind force. In the configuration proposed in Patent Document 2, it is difficult to perform positioning the head with high precision because the head needs to be moved upward and downward quickly. Further, the drive system may be complicated. In the configuration proposed in Patent Document 3, since the spur comes into contact with the printed surface, the image may be disturbed. In addition, the spur may become conveyance resistance, causing the sheet to slip against the suction belt. The configuration proposed in Patent Document 4 has a problem that it is not suitable for high-speed continuous printing. In the configuration proposed in Patent Document 5, when a plurality of head units is provided in the conveyance direction, a large number of rollers are provided, which complicates the configuration.

The invention is to provide an inkjet recording apparatus in which floating of a sheet from a conveyance belt at both end portions in the width direction intersecting the conveyance direction can be suppressed with a simple configuration.

Means of Solving the Problems

To solve the above problem, an inkjet recording apparatus includes: an endless conveyance belt which attracts a sheet and conveys it in a predetermined conveyance direction; a recording head provided with an ejection port formed surface on which an ejection port for ejecting ink is formed, the ejection port formed surface facing an outer circumferential surface of the conveyance belt with a predetermined gap; and a conveyance guide which faces the conveyance belt on an upstream side of the ejection port formed surface in the conveyance direction, is provided within a range containing both end portions of the conveyed sheet in a width direction intersecting the conveyance direction, and projects toward the conveyance belt more than the ejection port formed surface.

Effects of the Invention

According to the present invention, it becomes possible to prevent floating of the sheet from a conveyance belt at both end portions in the width direction intersecting the conveyance direction can be suppressed with a simple configuration.

EMBODIMENT FOR CARRYING OUT THE INVENTION

Hereinafter, with reference to the attached drawings, a printer (an inkjet recording apparatus) will be described.

Figure 1:
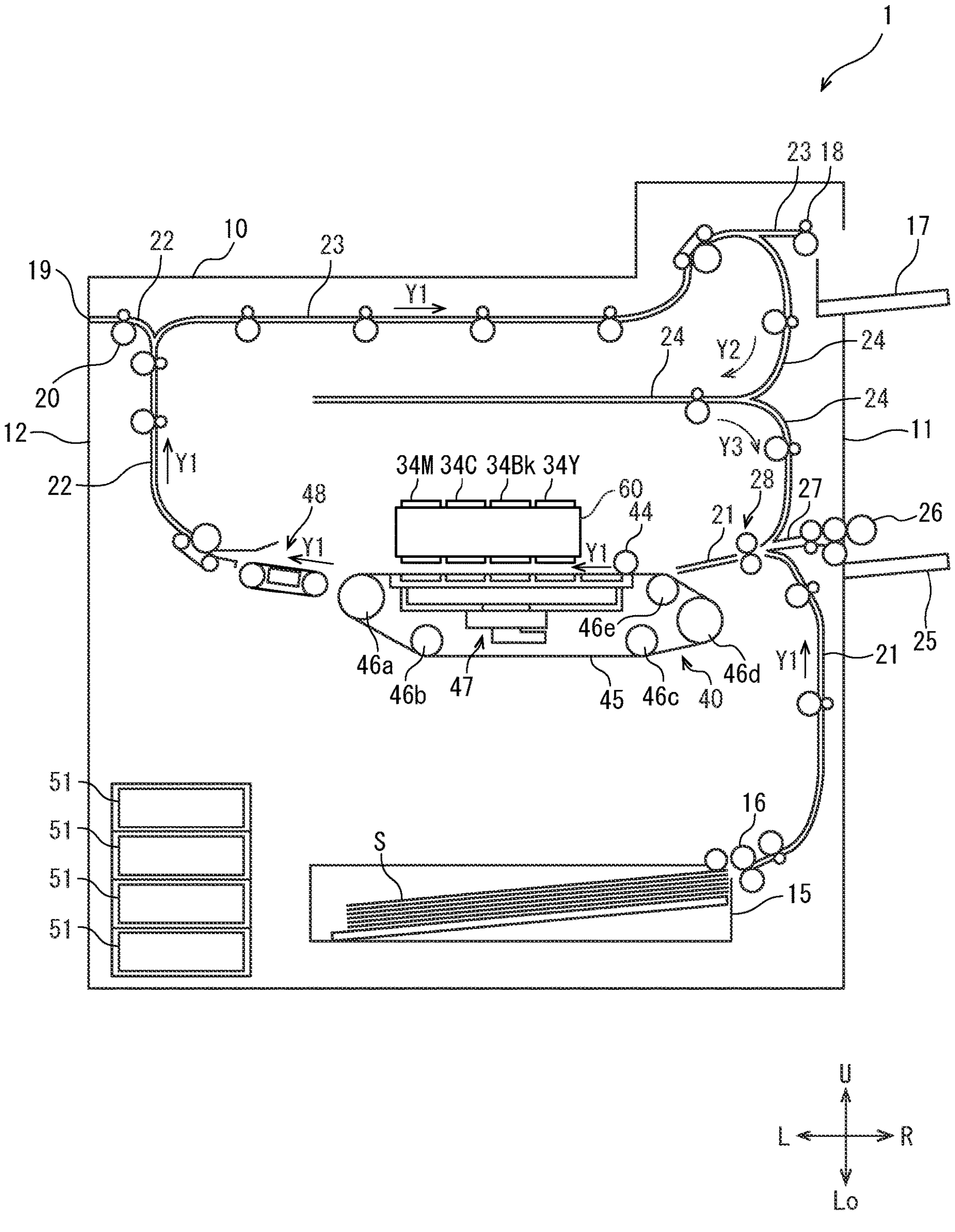
FIG. 1 is a front view schematically showing an internal structure of an image forming apparatus according to one embodiment of the present invention.

First, the overall structure of the printer 1 will be described. FIG. 1 is a front view schematically showing the internal structure of the printer 1. Hereafter, the front side of the paper plane on which FIG. 1 is drawn is defined as the front side of the printer 1, and the left-and-right direction is described on the basis of the direction in which the printer 1 is viewed from the front side. In each drawing, U, Lo, L, R, Fr and Rr indicate upper, lower, left, right, front and rear, respectively.

As shown in FIG. 1, the printer 1 is an inkjet type image forming apparatus which forms an image by ejecting ink onto a sheet S (a plain paper, a coated paper or the like), and can perform single-sided printing and double-sided printing on the sheet S. The printer 1 includes a box-shaped body housing 10 in which various devices are housed. A drawable sheet feeding cassette 15 in which the sheet S is set is housed in the lower portion of the body housing 10, and a manual sheet feeding tray 25 on which the sheet S is manually placed is installed on the right side surface 11 of the body housing 10. Above the manual sheet feeding tray 25, a sheet discharge tray 17 on which the image-formed sheet S is stacked is installed. On the upper portion of the left side surface of the body housing 10, a discharge port 19 through which the sheet S is conveyed to a post-processing device (not shown) disposed on the left side of the printer 1 is formed.

In the center portion inside the body housing 10, head units 34Y, 34Bk, 34C and 34M (collectively referred to as the head unit 34) which form images on the sheet S are provided, a conveying unit 40 which conveys the sheet on which the image is to be formed is provided below the head unit 34, and a drying unit 48 which dries the image-formed sheet S while conveying it is provided on the left side of the conveying unit 40. In the left lower portion inside the body housing 10, ink containers 51 filled with the ink are housed.

The conveying unit 40 includes a drive roller 46*a*, a plurality of driven rollers 46*b*, 46*c*, 46*d* and 46*e*, an endless conveyance belt 45 wound around them, and a suction part 47. When the drive roller 46*a* is driven by a driving source (not shown) such as a motor, the conveyance belt 45 is traveled in the counterclockwise direction in FIG. 1. A large number of through-holes (not shown) are formed in the conveyance belt 45. The suction part 47 is arranged in a position facing the head unit 34 inside the conveyance belt 45, and generates negative pressure in the through-holes of the conveyance belt 45 by sucking air to attract the sheet S to the conveyance belt 45.

On the right side of the conveying unit 40, a first conveyance path 21 from the sheet feeding cassette 15 to the conveying unit 40, and a manual sheet conveyance path 27 merging from the manual sheet feeding tray 25 to the first conveyance path 21 are provided. On the left side of the drying unit 48, a second conveyance path 22 from the drying unit 48 to the discharge port 19 is provided. Above the head unit 34, a third conveyance path 23 branching from the second conveyance path 22 to the discharge tray 17 and a fourth conveyance path 24 branching from the third conveyance path 23 to merge with the first conveyance path 21 are provided. At the branch points between the second conveyance path 22 and the third conveyance path 23, and between the third conveyance path 23 and the fourth conveyance path 24, guide members are provided to guide the conveyance of the sheet S (not shown).

On the first conveyance path 21, a sheet feeding roller 16 and a pair of registration rollers 28 are provided. The sheet feeding roller 16 feeds the sheet S housed in the sheet feeding cassette 15 one by one to the first conveyance path 21. The pair of registration rollers 28 is disposed on the downstream side of the sheet feeding roller 16 in the conveyance direction (Y1 direction), corrects the skew of the sheet S and then feeds the sheet S in synchronization with the timing of image formation.

The manual sheet conveyance path 27 merges with the first conveyance path 21 between the sheet feeding roller 16 and the pair of registration rollers 28. On the manual sheet conveyance path 27, a manual sheet feeding roller 26 which feeds the sheet S placed on the manual sheet feeding tray 25 to the manual sheet conveyance path 27 one by one is provided.

At the downstream end of the second conveyance path 22 in the conveyance direction, a first discharge roller 20 is provided to discharge the sheet S from the discharge port 19. At the downstream end of the third conveyance path 23 in the conveyance direction, a second discharge roller 18 is provided to discharge the sheet S to the discharge tray 17. The fourth conveyance path 24 inverses the sheet S upside down by switching back the sheet S from the Y2 direction to the Y3 direction in the case of duplex printing, and then sends the sheet S to the first conveyance path 21.

Next, an overview of the image forming operation of the printer 1 will be described. When an image forming job is input to the printer 1, the sheet S is fed from the sheet feeding cassette 15 or the manual sheet feeding tray 25, and conveyed in the Y1 direction along the first conveyance path 21. Next, the leading end of the sheet S comes into contact with the nip region of the pair of registration rollers 28, which has stopped rotating, to correct the skew of the sheet S, and then the pair of registration rollers 28 sends out the sheet S in synchronization with the ink ejection timing by the head unit 34. The sheet S is attracted to the conveyance belt 45 by the negative pressure in the through-holes of the conveyance belt 45, and is conveyed. Then, an image is formed on the sheet S by ejecting the ink droplets from the head unit 34 to the sheet S. The image-formed sheet S is conveyed by the drying unit 48, and drying of the ink is accelerated. The sheet S is conveyed along the second conveyance path 22 and the third conveyance path 23, and discharged to the discharge tray 17 by the second discharge roller 18.

Figure 2:
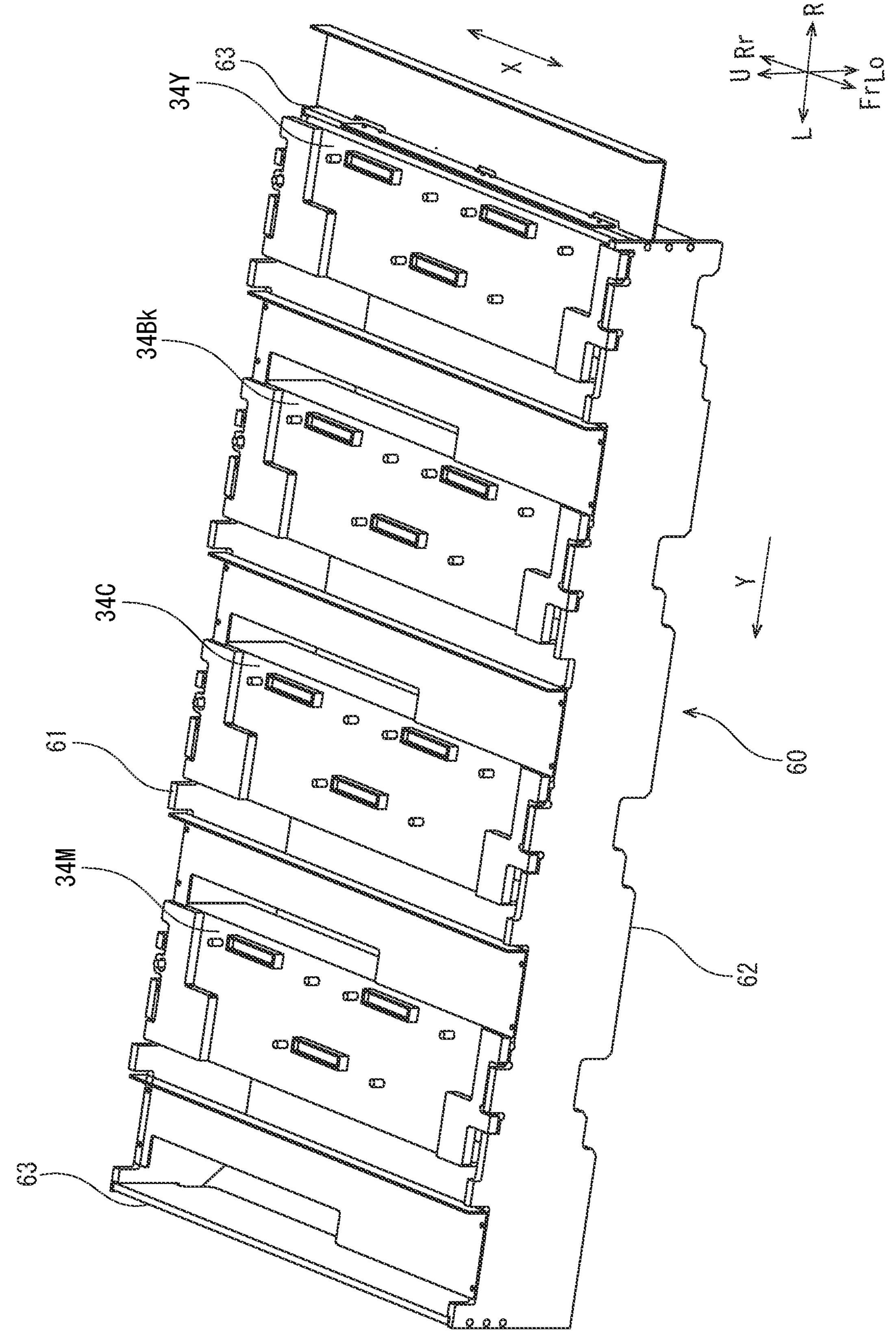
FIG. 2 is a perspective view showing a head unit mounted to a frame, according to the embodiment of the present invention.
Figure 3:
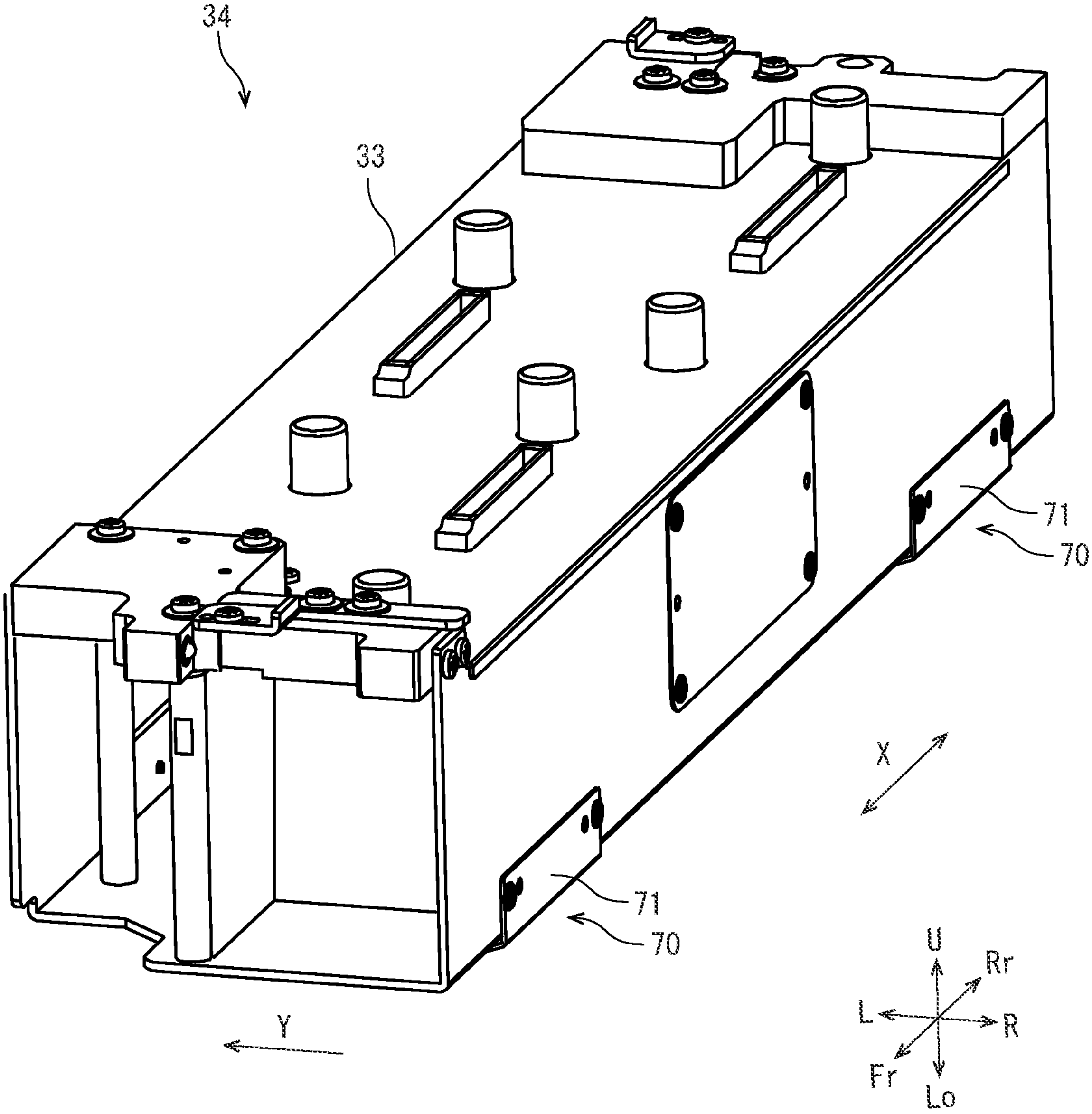
FIG. 3 is a perspective view showing the head unit according to the embodiment of the present invention.
Figure 4:
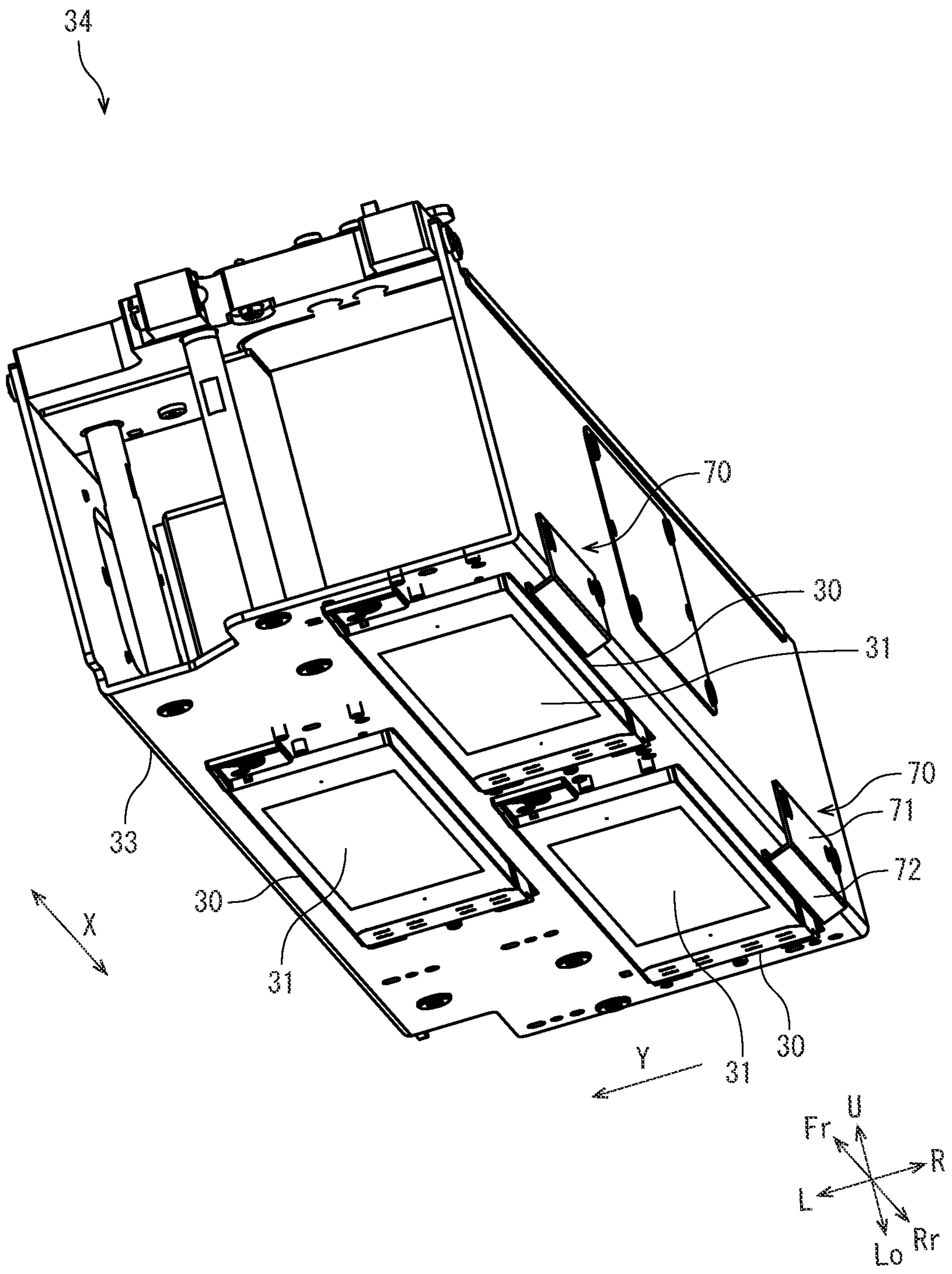
FIG. 4 is a perspective view showing the head unit according to the embodiment of the present invention.
Figure 5:
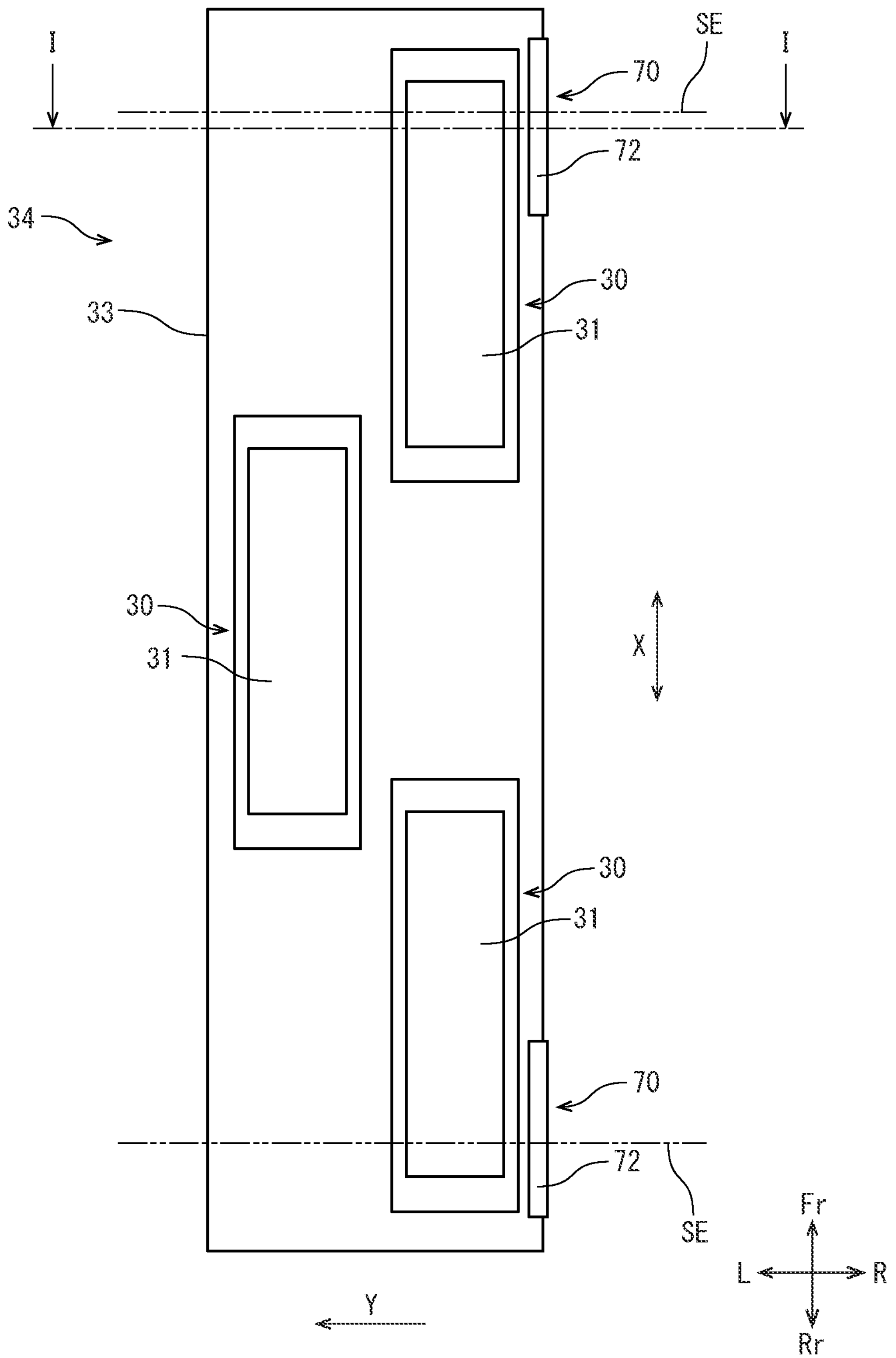
FIG. 5 is a plan view showing the lower surface of the head unit according to the embodiment of the present invention.
Figure 6A:
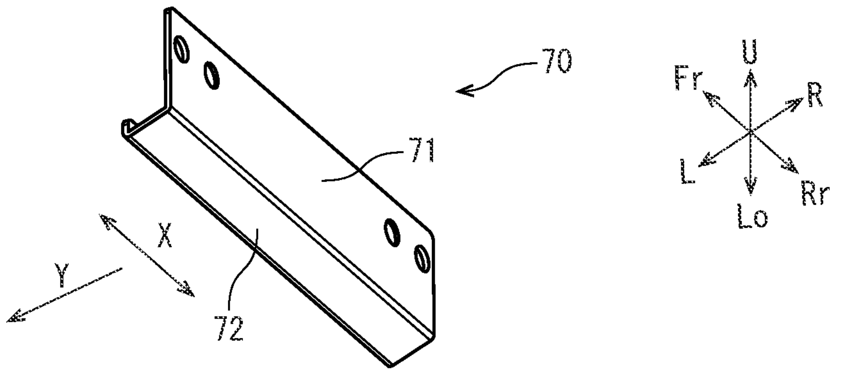
FIG. 6A is a perspective view showing a conveyance guide according to the embodiment of the present invention.
Figure 6B:
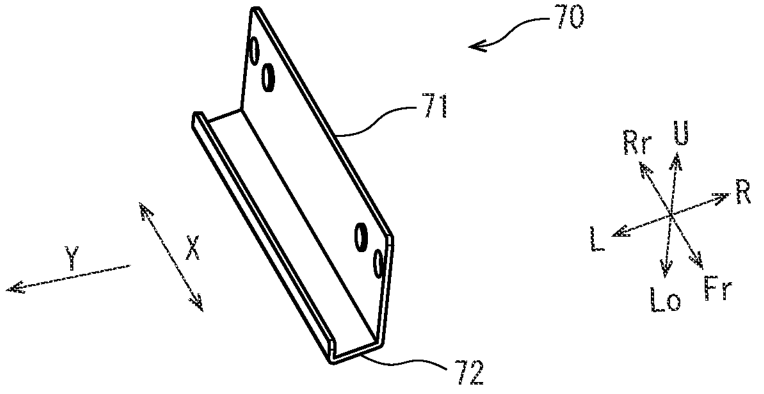
FIG. 6B is a perspective view showing the conveyance guide according to the embodiment of the present invention.
Figure 6C:
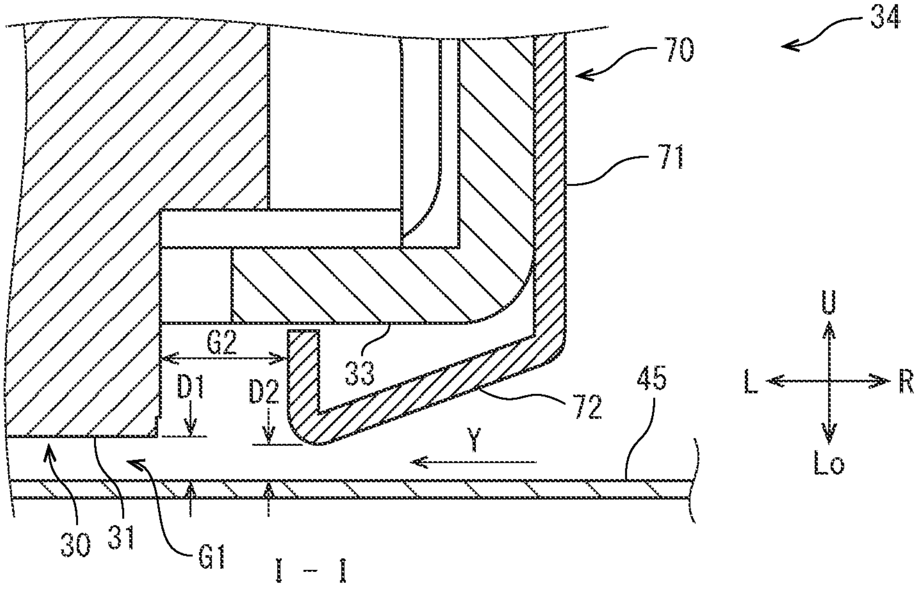
FIG. 6C is a sectional view taken along the line I-I in FIG. 5 showing the head unit.
Figure 7:
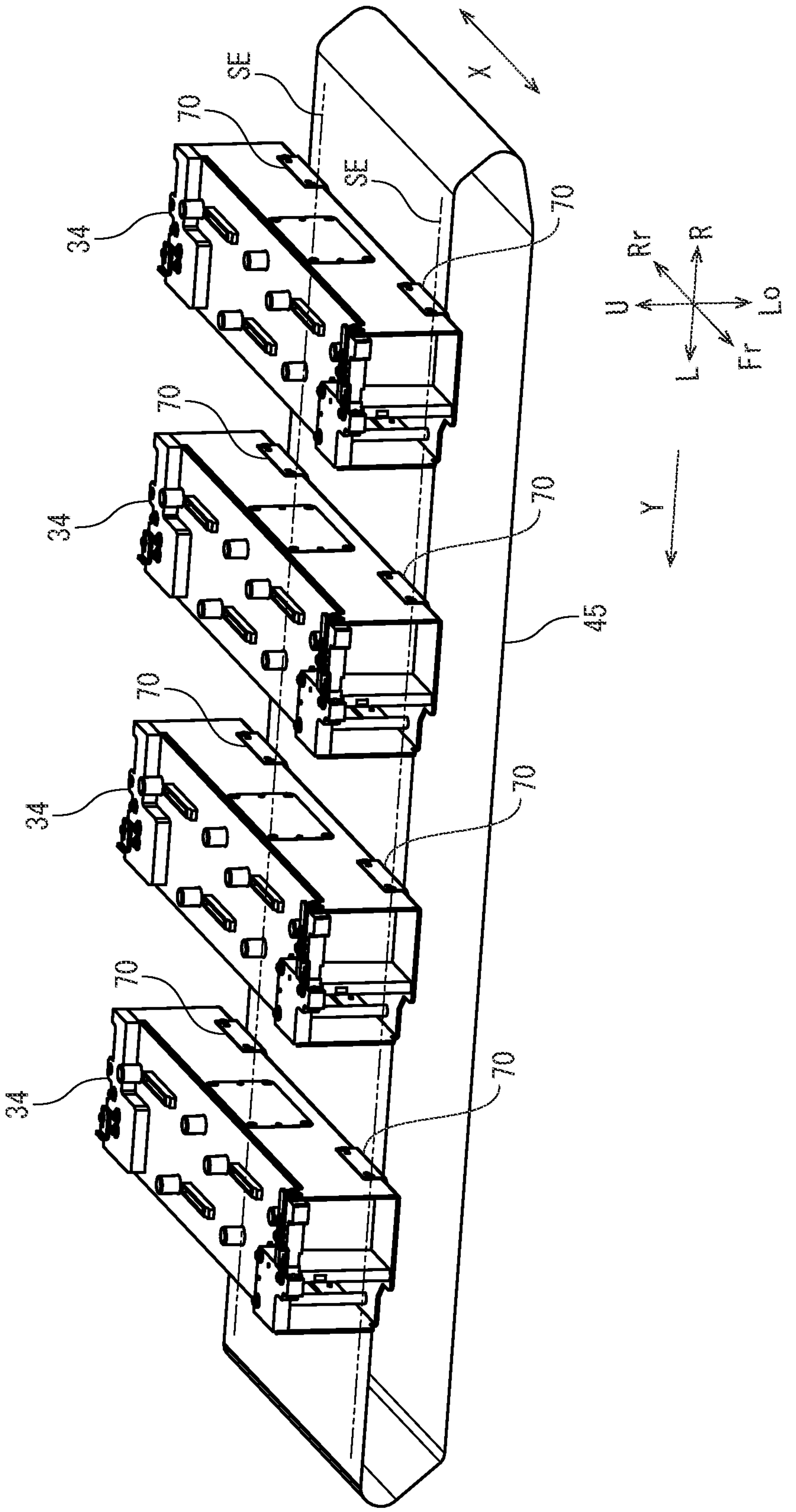
FIG. 7 is a perspective view showing the head unit and a conveyance belt according to the embodiment of the present invention.

Next, the head unit 34 will be described in detail. FIG. 2 is a perspective view showing the head unit 34 mounted to a frame 60. FIG. 3 and FIG. 4 are perspective views showing the head unit 34. FIG. 5 is a plan view showing the lower surface of the head unit 34. FIG. 6A and FIG. 6B are perspective views showing a conveyance guide 70. FIG. 6C is a sectional view taken along the line I-I in FIG. 5 showing the head unit 34. FIG. 7 is a perspective view showing the head unit 34 and the conveyance belt 45.

The printer 1 includes the endless conveyance belt 45 which attracts the sheet S and conveys it; the recording head 30 provided with the ejection port formed surface 31 on which the ejection port for ejecting the ink is formed, the ejection port formed surface 31 facing an outer circumferential surface of the conveyance belt 45 with a predetermined gap; and the conveyance guide 70 which faces the conveyance belt 45 on an upstream side of the ejection port formed surface 3) in the conveyance direction Y, is provided within a range containing both end portions SE of the conveyed sheet S in the width direction X intersecting the conveyance direction Y, and projects toward the conveyance belt 45) more than the ejection port formed surface 31. The conveyance belt 45 is described above.

[Recording Head] The head units 34Y, 34Bk, 34C and 34M (collectively referred to as the head unit 34) are arranged in order from the upstream side in the conveyance direction Y (see FIG. 2), and eject the yellow, black, cyan and magenta inks, respectively. The head unit 34 includes a frame 33 and a recording head 30 (see FIG. 3 to FIG. 5). The frame 33 is formed in an approximately rectangular box shape whose longitudinal direction is along the front-and-rear direction. The recording head 30 is a line head in which a number of ejection ports (not shown) arranged in the width direction X of the conveyance belt 45 intersecting the conveyance direction Y are formed on the bottom portion. The bottom portion of the recording head 30 is made of metal such as stainless steel, and the ejection port is formed by drilling. Hereafter, the lower surface of the bottom portion of the recording head 30 is referred to as the ejection port formed surface 31.

The frame 33 is provided with one or more recording heads 30. In this embodiment, the three recording heads 30 are provided. The three recording heads 30 are disposed in a zigzag pattern in the width direction X. On the upper surface of the head unit 34, a connector to which a signal line for inputting a drive signal to drive the recording head 30 is connected and a connector to which a pipe for supplying the ink from the ink container 51 is connected are provided. The head units 34Y, 34Bk, 34C and 34M may be arranged in a different order from the illustrated example.

The frame 60 (see FIG. 2) includes a first support member 61, a second support member 62, and a pair of connecting members 63. The first support member 61, the second support member 62 and the connecting members 63 are all made of metal such as aluminum alloy. The first support member 61 and the second support member 62 are plate-like members whose longitudinal direction is along the conveyance direction Y, and are provided so as to face each other in the width direction W with the first support member 61 on the rear side and the second support member 62 on the front side. The connecting members 63 are plate-like members whose longitudinal direction is along the width direction X, and are provided to face each other in the conveyance direction Y. The right end portions of the first support member 61 and the second support member 62 are connected to each other by the connecting member 63, and the left end portions of the first support member 61 and the second support member 62 are connected to each other by the connecting member 63. The first support member 61 supports the rear end portion of the head unit 34, and the second support member 62 supports the front end portion of the head unit 34.

[Conveyance Guide] The conveyance guide 70 is made of metal, resin or the like, and is mounted to the frame 33 of the head unit 34. The conveyance guide 70 faces the conveyance belt 45 on the upstream side of the ejection port formed surface 31 of the recording head 30 in the conveyance direction Y. The conveyance guide 70 includes a mounting part 71 mounted to the frame 33 and a facing part 72 facing the conveyance belt 45 (see FIG. 6A and FIG. 6B).

The mounting part 71 is a plate-like part parallel to the upstream side surface of the frame 33 in the conveyance direction Y. The mounting part 71 is mounted to the frame 33 using screws (see FIG. 3 and FIG. 4).

The facing part 72 is a plate-like part formed on the downstream side of the lower end portion of the mounting part 71 in the conveyance direction Y. The lower surface of the facing part 72 is formed so as to be inclined such that a distance between the lower surface and the conveyance belt 45 is shorter toward the downstream side in the conveyance direction Y (see FIG. 6C). The distance D2 between the lowest portion of the lower surface of the facing part 72 and the conveyance belt 45 is shorter than the distance D1 between the ejection port formed surface 31 of the recording head 30 and the conveyance belt 45. In other words, the conveyance guide 70 projects toward the conveyance belt 45 more than the ejection port formed surface 31.

The printer 1 is provided with a cleaning unit for cleaning the ejection port formed surface 31 of the recording head 30 (not shown). The cleaning unit includes a wipe blade (not shown), and removes the ink adhering to the ejection port formed surface 31 by sliding the wipe blade against the ejection port formed surface 31. Since the width of the wipe blade in the conveyance direction Y is wider than the width of the ejection port formed surface 31 in the conveyance direction Y, a gap G2 is provided between the recording head 30 and the downstream end portion of the facing part 72 of the conveyance guide 70 in the conveyance direction Y in order to avoid interference between the wipe blade and the conveyance guide 70.

In FIG. 5 and FIG. 7, the positions of the end portions SE in the width direction X of the sheet S to be conveyed are shown by the two-dotted chain lines. The conveyance guide 70 is provided within a range including both the end portions SE in the width direction X of the sheet S to be conveyed. The two conveyance guides 70 are provided at two locations corresponding to both the end portions of the sheet S in the width direction X. The conveyance guide 70 is provided within a range including a space outside both the end portions SE of the sheet S in the width direction X.

Figure 8A:
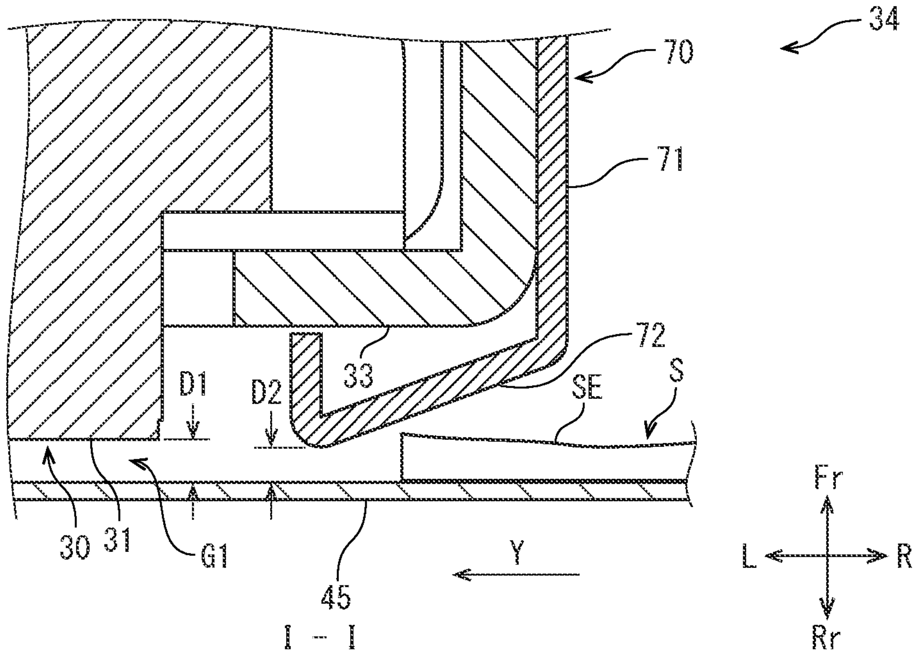
FIG. 8A is a sectional view taken along the line I-I, showing a sheet conveyance state.
Figure 8B:
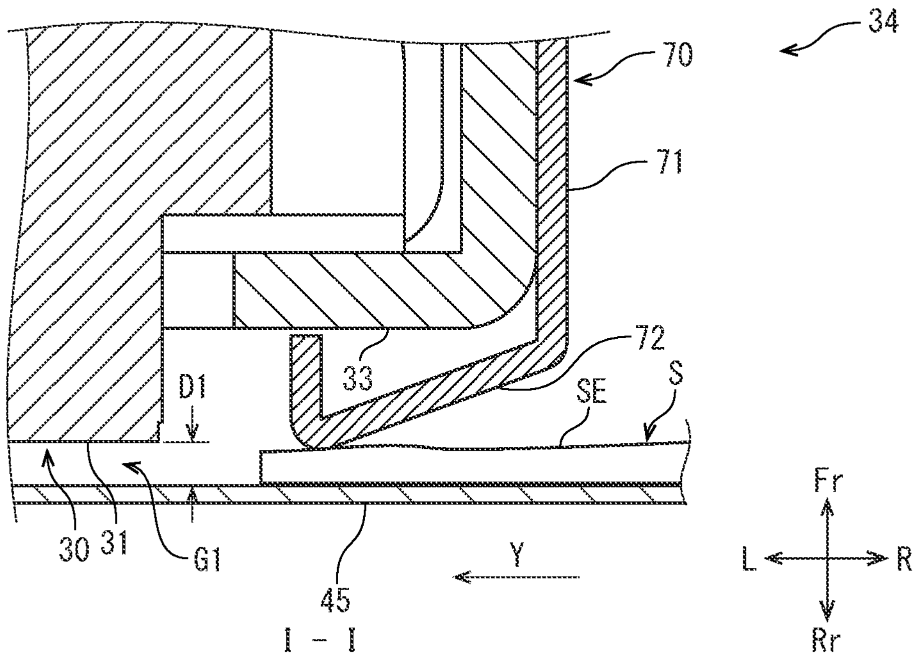
FIG. 8B is a sectional view taken along the line I-I, showing a sheet conveyance state.
Figure 9:
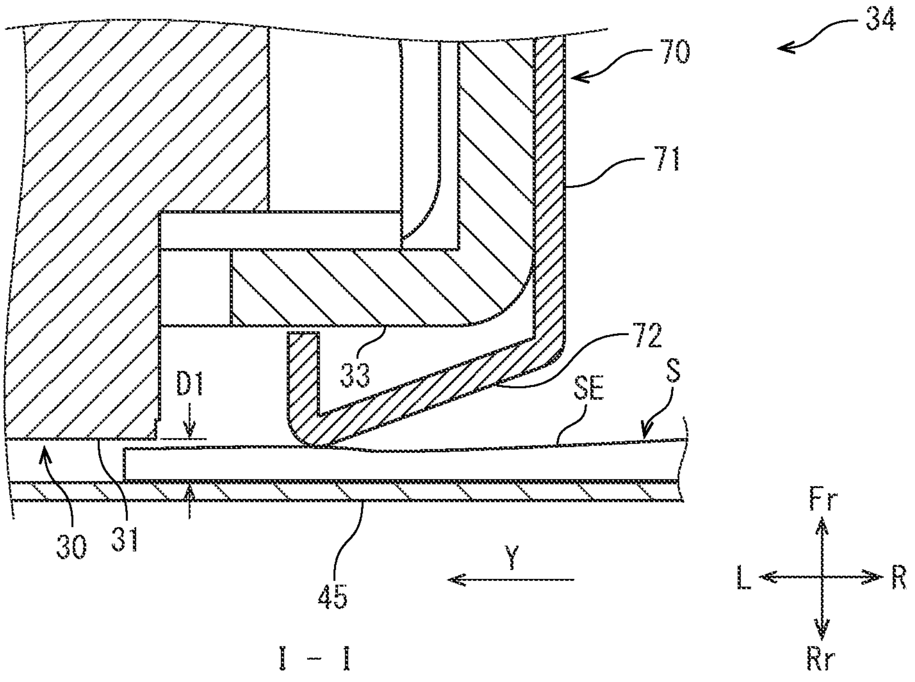
FIG. 9 is a sectional view taken along the line I-I, showing a sheet conveyance state.

FIG. 8A to FIG. 9 are sectional views taken along the line I-I, showing a state where the sheet S is conveyed. The drawings show a state where the end portions SE of the sheet S in the width direction X are floating from the conveyance belt 45. As shown in FIG. 8A, in a case where the floating of the end portion SE of the sheet S is larger than the distance D2 between the lowest portion of the lower surface of the facing part 72 and the conveyance belt 45, as shown in FIG. 8B, the end portion SE of the sheet S comes into contact with the facing part 72 to be guided to the conveyance belt 45 long the facing part 72, and the floating of the end portion SE is suppressed to the distance D2 or less. As a result, as shown in FIG. 9, since the end portion SE of the sheet S does not come into contact with the ejection port formed surface 31 of the recording head 30, jamming of the sheet S and damage to the ejection port formed surface 31 can be prevented.

According to the printer 1 according to the present embodiment described above, the floating of both the end portions SE of the sheet S in the width direction X intersecting with the conveyance direction Y of the sheet S from the conveyance belt 45 can be suppressed with a simple configuration.

In addition, according to the printer 1 according to the present embodiment, since the conveyance guide 70 is provided at two locations corresponding to both the end portions SE of the sheet S in the width direction X, the material cost can be saved compared with the case where the conveyance guide 70 is provided within the entire area between both the end portions SE.

In addition, according to the printer 1 according to the present embodiment, since the conveyance guide 70 is provided within a range including a space outside both the end portions SE of the sheet S in the width direction X, the floating of both the end portions SE can be suppressed even when the displacement of the sheet S in the width direction X occurs.

In addition, according to the printer 1 according to the present embodiment, since the distance between the lower surface of the facing part 72 (the surface of the conveyance guide 70 facing the conveyance belt 45) and the conveyance belt 45 is shorter toward the downstream side in the conveyance direction Y, both the end portions SE of the sheet S can be smoothly guided to the conveyance belt 45.

In addition, according to the printer 1 according to the present embodiment, since the frame 33 for supporting the recording head 30 is provided and the conveyance guide 70 is mounted to the frame 33, the impact generated when the sheet S comes into contact with the conveyance guide 70 is less transmitted to the recording head 30 compared with the case where the conveyance guide 70 is mounted directly to the recording head 30, and the deterioration in image quality can be suppressed.

In addition, according to the printer 1 according to the present embodiment, since a gap G2 is provided between the recording head 30 and the downstream end portion of the facing part 72 of the conveyance guide 70 in the conveyance direction Y, the interference between the wipe blade and the conveyance guide 70 can be avoided. In addition, since the impact generated when the sheet S comes into contact with the conveyance guide 70 becomes hard to be transmitted to the recording head 30, the deterioration in image quality can be suppressed. In order to prevent the floating of both the end portions SE from increasing again after the leading end of the sheet S passes under the conveyance guide 70, it is desirable that the dimension of the gap G2 be set as small as possible within the range where there is no interference between the wipe blade and the conveyance guide 70.

The above embodiment may be modified as follows.

Figure 10:
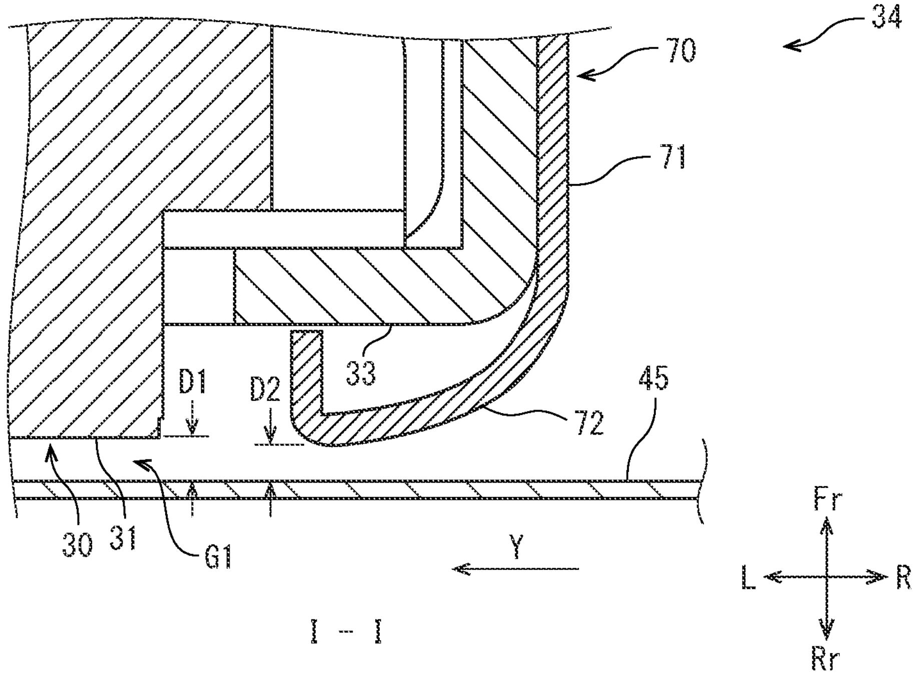
FIG. 10 is a sectional view taken along the line I-I, showing the head unit according to a modified example of the embodiment of the present invention.

FIG. 10 is a sectional view taken along the line I-I, showing the head unit 34. In the above embodiment, an example is shown in which the lower surface of the facing part 72 is formed so as to be inclined, but as shown in FIG. 10, the lower surface of the facing part 72 may be formed into a convex curved surface shape. With this configuration, the same effect as the above embodiment can be obtained.

Figure 11:
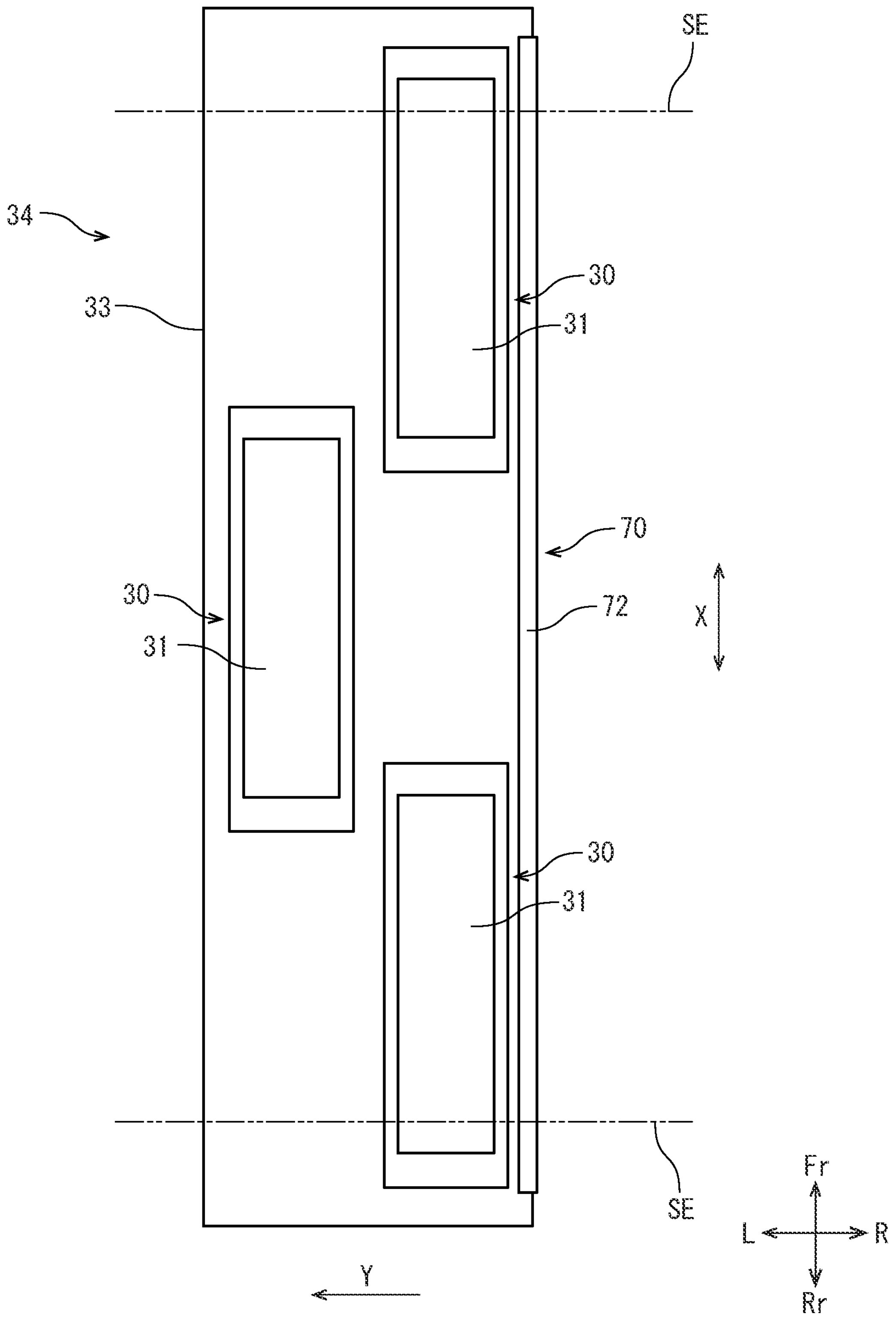
FIG. 11 is a plan view showing the lower surface of the head unit according to the modified example of the embodiment of the present invention.

FIG. 11 is a plan view showing the lower surface of the head unit 34. In the above embodiment, the two conveyance guides 70 are provided corresponding to both the end portions SE of the sheet S in the width direction X, but as shown in FIG. 11, one conveyance guide 70 may be provided over the entire area between both the end portions SE.

Figure 12:
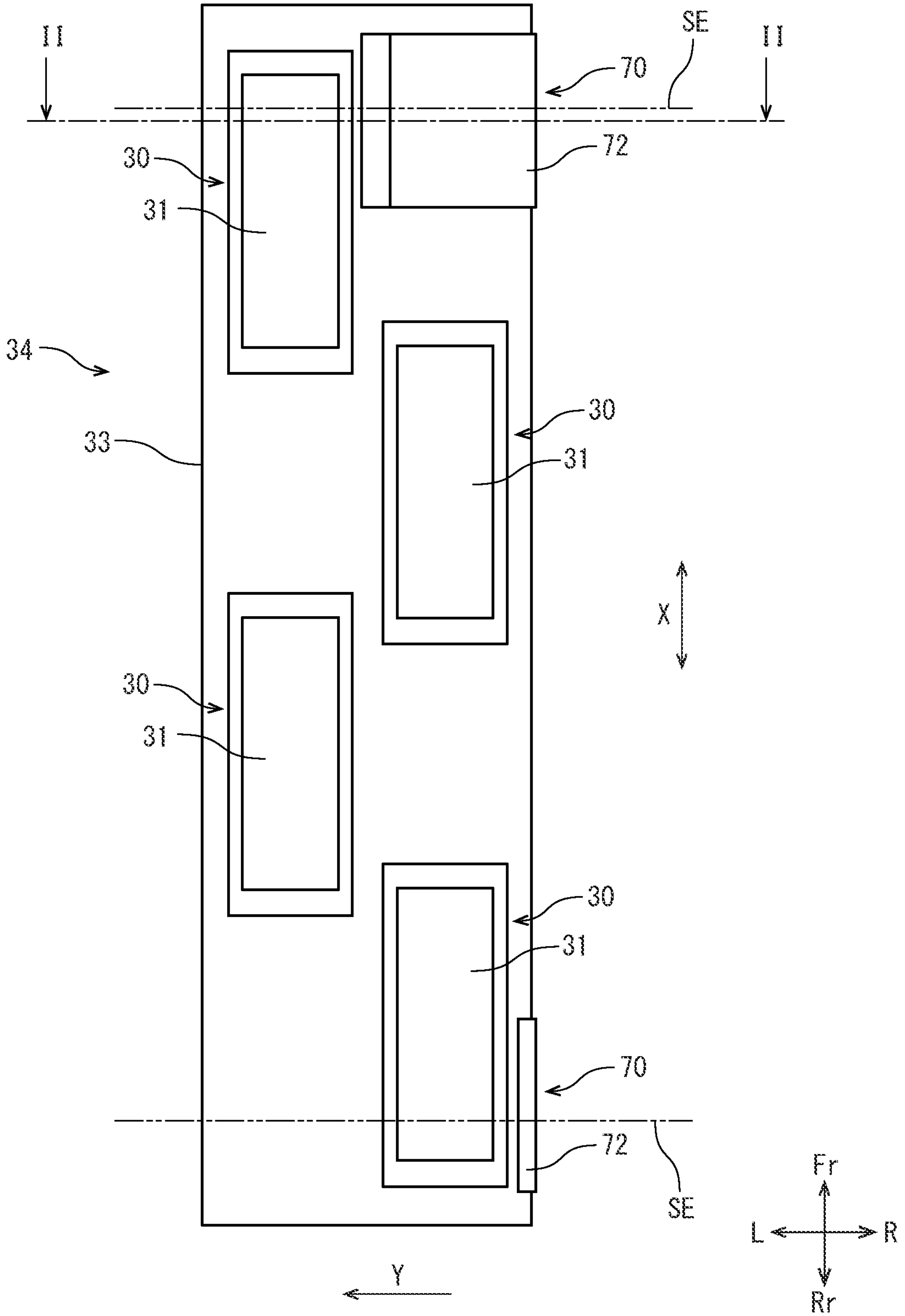
FIG. 12 is a plan view showing the lower surface of the head unit according to the modified example of the embodiment of the present invention.
Figure 13:
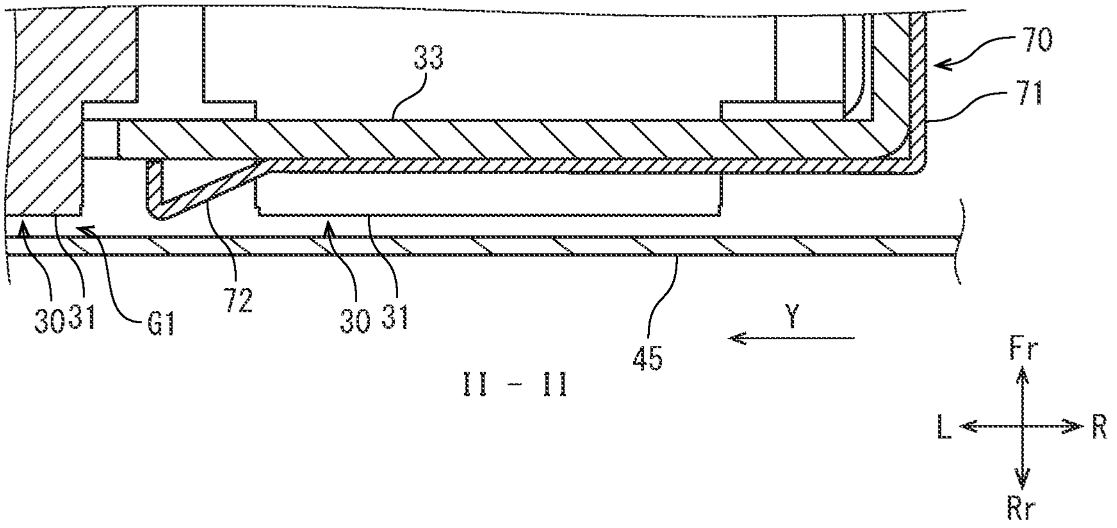
FIG. 13 is a sectional view taken along the line II-II in FIG. 12, showing the head unit.

FIG. 12 is a plan view showing the lower surface of the head unit 34. FIG. 13 is a sectional view taken along the line II-II in FIG. 12, showing the head unit 34. In the above embodiment, an example is shown in which an odd number (three) of recording heads 30 are disposed in a zigzag pattern in the head unit 34. But, as shown in FIG. 12, the present invention may be applied to the printer 1 in which an even number (four, in this example) of recording heads 30 are disposed in a zigzag pattern in the head unit 34. In this case, since the recording head 30 on one end side of the head unit 34 (the front end side in this example) is provided on the downstream side in the conveyance direction Y compared with the above embodiment, the distance between the recording head 30 and the upstream side surface of the frame 33 in the conveyance direction Y becomes longer. Therefore, as shown in FIG. 12 and FIG. 13, the conveyance guide 70 may be provided with the facing part 72 whose length depends on the distance between the recording head 30 and the upstream side surface of the frame 33 in the conveyance direction Y. In this case, the lower surface of the facing part 72 may be formed so as to be inclined over the entire area in the conveyance direction Y, but as shown in FIG. 13, only a part of the predetermined length from the downstream end of the conveyance direction Y may be formed so as to be inclined, and the part on the upstream side of the above inclined part may be formed parallel to the conveyance belt 45. With this configuration, the same effect as the above embodiment can be obtained.

In the above examples, the conveyance guide 70 is mounted to the frame 33, but the conveyance guide 70 may be mounted to the recording head 30.

The invention claimed is:

1. An inkjet recording apparatus comprising:
an endless conveyance belt which attracts a sheet and conveys it in a predetermined conveyance direction;
a recording head provided with an ejection port formed surface on which an ejection port for ejecting ink is formed, the ejection port formed surface facing an outer circumferential surface of the conveyance belt with a predetermined gap; and
a conveyance guide contains two independent members which face the conveyance belt on an upstream side of the ejection port formed surface in the conveyance direction, and are provided at two locations corresponding to both end portions of the conveyed sheet in a width direction intersecting the conveyance direction, the two independent members being provided one by one as separate members at the two locations, wherein
each of the independent members projects toward the conveyance belt more than the ejection port formed surface, and extends parallel to the width direction within a predetermined range including the end portion and a space outside the end portion in the width direction.

2. The inkjet recording apparatus according to claim 1, comprising a frame supporting the recording head, wherein
each of the conveyance guides is mounted to a side surface of the frame on the upstream side of the recording head in the conveyance direction.

3. The inkjet recording apparatus according to claim 1, wherein the conveyance guide is provided within a range containing a space outside the end portions of the sheet in the width direction.

4. The inkjet recording apparatus according to claim 1, wherein a distance between a surface of the conveyance guide facing the conveyance belt and the conveyance belt becomes shorter toward a downstream side in the conveyance direction.

5. The inkjet recording apparatus according to claim 2, wherein the conveyance guide includes a plate-like mounting part mounted to the frame and a plate-like facing part extending from a lower end portion of the mounting portion to the downstream side in the conveyance direction.

6. The inkjet recording apparatus according to claim 1, further comprising:

a cleaning unit provided with a wipe blade which moves in the width direction and cleaning the ejection port formed surface, wherein a wipe blade has a width wider than a width of the ejection port formed surface in the conveyance direction, and the most downstream end portion of the conveyance guide in the conveyance direction is positioned more upstream in the conveyance direction than a moving region of the wipe blade.

* * * * *